United States Patent
Hwang et al.

(10) Patent No.: US 12,277,157 B2
(45) Date of Patent: Apr. 15, 2025

(54) METHOD AND APPARATUS FOR DOCUMENT SUMMARIZATION

(71) Applicant: SAMSUNG SDS CO., LTD., Seoul (KR)

(72) Inventors: Bongkyu Hwang, Seoul (KR); Judong Kim, Seoul (KR); Jaewoong Yun, Seoul (KR); Hyunjae Lee, Seoul (KR); Hyunjin Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 300 days.

(21) Appl. No.: 17/974,652

(22) Filed: Oct. 27, 2022

(65) Prior Publication Data

US 2023/0140338 A1 May 4, 2023

(30) Foreign Application Priority Data

Oct. 29, 2021 (KR) .................. 10-2021-0146956

(51) Int. Cl.
*G06F 40/284* (2020.01)
*G06F 16/34* (2019.01)
(52) U.S. Cl.
CPC .......... *G06F 16/345* (2019.01); *G06F 40/284* (2020.01)

(58) Field of Classification Search
CPC ............................ G06F 16/345; G06F 40/284
USPC ................. 704/231, 238, 240, 251
See application file for complete search history.

(56) References Cited

U.S. PATENT DOCUMENTS

2019/0362020 A1* 11/2019 Paulus .............. G06F 18/24143
2019/0370338 A1* 12/2019 Kong .................... G06F 16/345

FOREIGN PATENT DOCUMENTS

KR    10-2018-0092732 A    8/2018

* cited by examiner

*Primary Examiner* — George C Monikang
(74) *Attorney, Agent, or Firm* — Sughrue Mion, PLLC

(57) ABSTRACT

A document summarizing apparatus includes an encoding unit receiving document data comprised of one or more sentences and converts the document data into a token defined in a predetermined unit to generate a feature vector, an extraction summary unit receiving the feature vector and calculating a probability value that each sentence corresponds to a summary, with respect to each one or more sentences constituting the document data, and generating an attention vector for each token weight based on the probability value, and a decoding unit receiving the feature vector and the attention vector and generating abstract summary data.

16 Claims, 7 Drawing Sheets

METHOD AND APPARATUS FOR DOCUMENT SUMMARIZATION

CROSS-REFERENCE TO RELATED APPLICATION AND CLAIM OF PRIORITY

This application claims the benefit under 35 USC § 119 of Korean Patent Application No. 10-2021-0146956 filed on Oct. 29, 2021 in the Korean Intellectual Property Office, the disclosure of which is incorporated herein by reference in its entirety.

BACKGROUND

1. Technical Field

The following description relates to a document summarization technique.

2. Description of Related Art

In general, training a deep learning model requires a large amount of labeled data, and this has presented difficulties in training the model. However, for recent image classification or speech recognition problems, research to improve performance of the model by using unlabeled data as training data is being actively undertaken.

On the other hand, in the field of text, unlike images or voices, since the meaning of the entire text may change significantly even when only a few words in the text are altered, not many studies have been conducted with regard thereto. In detail, research on the text summary field is insignificant.

SUMMARY

An aspect of the present disclosure is to provide a method and apparatus for document summarization.

According to an aspect of the present disclosure, a document summarizing apparatus includes an encoding unit receiving document data comprised of one or more sentences and converting the document data into a token defined in a predetermined unit to generate a feature vector; an extraction summary unit receiving the feature vector and calculating a probability value that each sentence corresponds to a summary, with respect to each one or more sentences constituting the document data, and generating an attention vector for each token weight based on the probability value; and a decoding unit receiving the feature vector and the attention vector and generating abstract summary data.

The extraction summary unit may be trained using an extraction loss function calculated based on the probability value and a summary label value for the document data.

The decoding unit may be trained using the abstract summary data generated based on the feature vector and the attention vector, and an abstract loss function calculated based on summary data for the document data.

The decoding unit may multiply the feature vector by the attention vector to assign a weight to each token included in the feature vector.

Each of the one or more sentences may include one or more tokens, and the one or more tokens constituting one sentence may all have the same weight.

According to an aspect of the present disclosure, a document summarizing apparatus includes an encoding unit receiving document data comprised of one or more sentences and converting the document data into a token defined in a predetermined unit to generate a feature vector; an extraction summary unit receiving the feature vector and calculating a probability value that each sentence corresponds to a summary with respect to each one or more sentences constituting the document data, to generate a probability vector for each sentence, and generating an attention vector for each token weight based on the probability value; a candidate data generator generating a plurality of summary candidate data from the one or more sentences constituting the document data based on the probability vector for each sentence; and a decoding unit receiving the feature vector, the attention vector, and the plurality of summary candidate data, and generating abstract summary data for each summary candidate data.

The candidate data generator may select n sentences in an order of a high probability value from among the one or more sentences constituting the document data based on the probability vector for each sentence, and may select one or more of the selected n sentences to create summary candidate data.

The decoding unit may be trained using a similarity loss function based on similarity of the abstract summary data with respect to the respective summary candidate data.

According to an aspect of the present disclosure, a document summarization method includes an encoding operation of receiving document data comprised of one or more sentences, converting the document data into a token defined in a predetermined unit, and generating a feature vector; an extraction summary operation of receiving the feature vector, calculating a probability value that each sentence corresponds to a summary, with respect to each one or more sentences constituting the document data, and generating an attention vector for a weight for each token based on the probability value; and a decoding operation of generating abstract summary data by receiving the feature vector and the attention vector as inputs.

In the extraction summary operation, learning may be performed using an extraction loss function calculated based on the probability value and a summary label value for the document data.

In the decoding operation, learning may be performed using an abstract loss function calculated based on the abstract summary data generated based on the feature vector and the attention vector and summary data for the document data.

In the decoding operation, a weight may be given to each token included in the feature vector by multiplying the feature vector by the attention vector.

Each of the one or more sentences may include one or more tokens, and the one or more tokens constituting a sentence all have the same weight.

According to an aspect of the present disclosure, a document summarization method includes an encoding operation of generating a feature vector by receiving document data comprised of one or more sentences and converting the document data into a token defined in a predetermined unit; an extraction summary operation of receiving the feature vector and calculating a probability value that each sentence corresponds to a summary with respect to each one or more sentences constituting the document data to generate a probability vector for each sentence, and generating an attention vector for each token weight based on the probability value; a candidate data generation operation of generating a plurality of summary candidate data from the one or more sentences constituting the document data based on the probability vector for each sentence; and a decoding operation of receiving the feature vector, the attention vector, and the plurality of summary candidate data, and generating abstract summary data for each summary candidate data.

The candidate data generation operation may be performed by selecting n sentences in an order of a high probability value from among the one or more sentences constituting the document data, based on the probability vector for each sentence, and selecting one or more of the selected n sentences to generate summary candidate data.

In the decoding operation, learning may be performed using a similarity loss function based on a similarity of the abstract summary data for each of the summary candidate data.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Hereinafter, detailed embodiments will be described with reference to the drawings. The following detailed description is to provide a comprehensive understanding of the methods, apparatus, and/or systems described herein. However, this is merely an example and the present disclosure is not limited thereto.

In describing the embodiments, when it is determined that a detailed description of the known technology related to the present disclosure may unnecessarily obscure the gist of the present disclosure, a detailed description thereof will be omitted. The terms to be described later are defined in consideration of the function in the present disclosure, and may vary depending on the intention or custom of the user or operator. Therefore, the definition should be made based on the content throughout this specification. The terminology used in the detailed description is for the use of describing embodiments only, and should not be particularly limited. Unless explicitly used otherwise, expressions in the singular include the meaning of the plural. In this description, expressions such as "including" or "provided" are intended to indicate certain features, numbers, steps, acts, elements, some or combinations thereof, and the same should not be construed to exclude the presence or possibility of one or more other features, numbers, steps, operations, elements, or any or any combination thereof other than those described.

Figure 1:
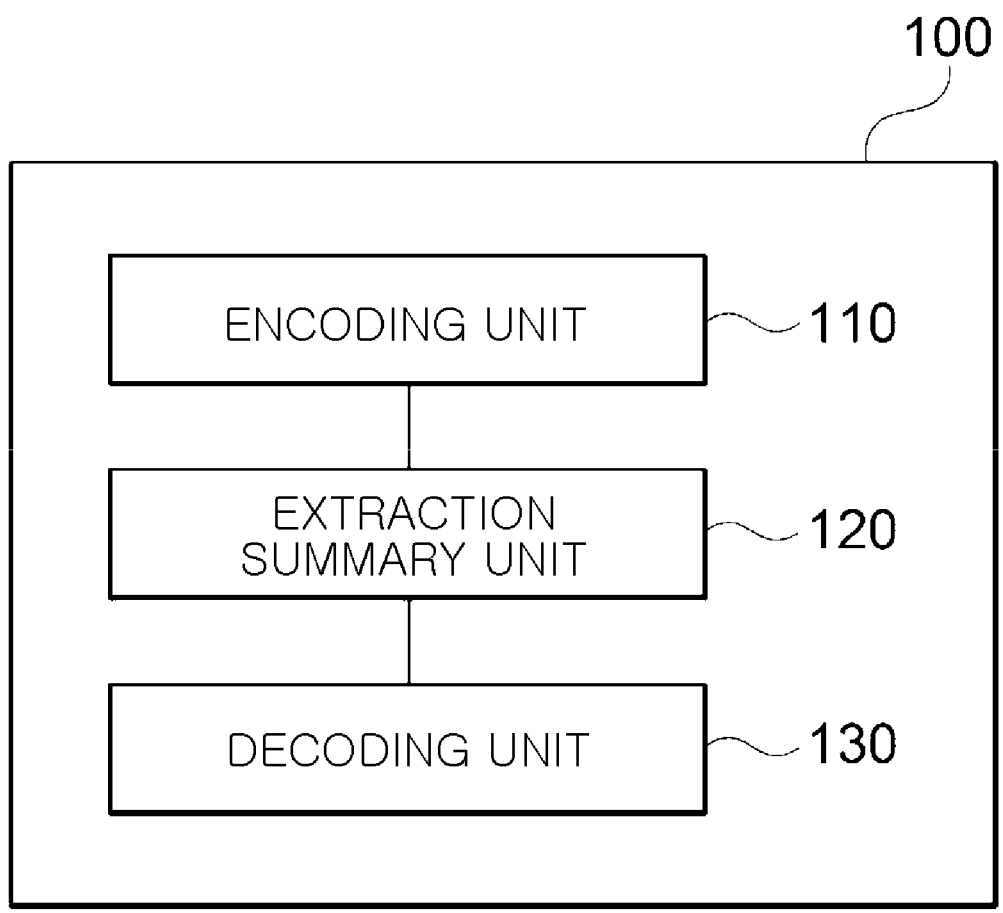
FIG. 1 is a block diagram of a document summarizing apparatus according to an embodiment.
Figure 2:
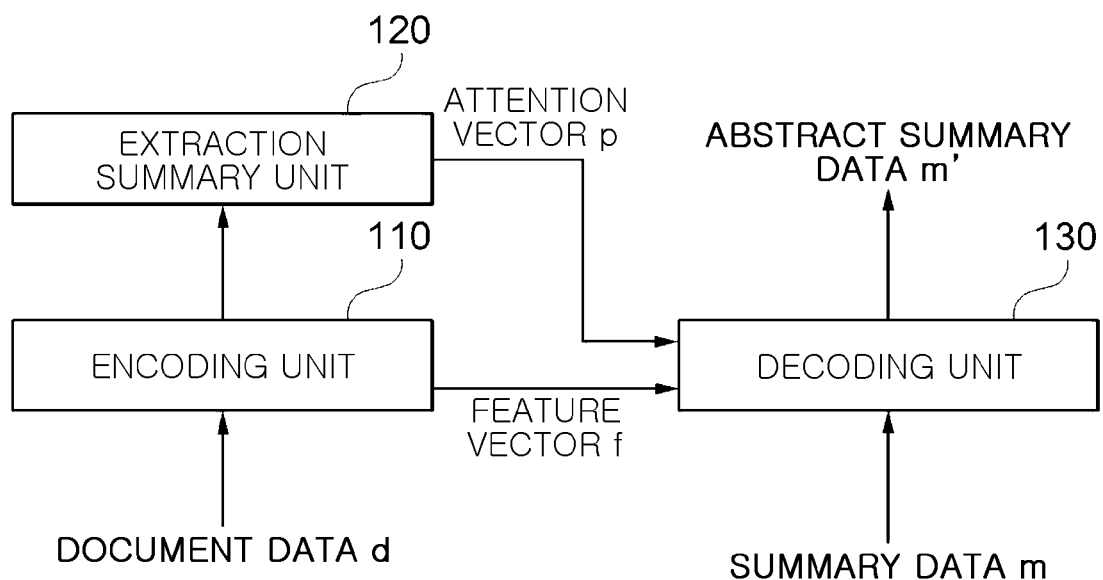
FIG. 2 is an illustrative diagram illustrating an operation of a document summarizing apparatus according to an embodiment.

FIG. 1 is a block diagram of a document summarizing apparatus according to an embodiment.

According to an embodiment, a document summarizing apparatus 100 may include an encoding unit 110, an extraction summary unit 120, and a decoding unit 130.

According to an embodiment, the encoding unit 110 may generate a feature vector by receiving document data comprised of one or more sentences and converting the received document data into a token defined in a predetermined unit.

According to an example, document data d may be classified for each sentence, using a specific delimiter. For example, document d={$d_1$, $d_2$, . . . , $d_n$} may consist of one or more sentences. The encoding unit 110 may recognize the document for each sentence thereby.

According to an example, the encoding unit 110 may receive the document d and convert the received document d into a token defined in a predetermined unit. For example, the predetermined unit may be a phoneme, a syllable, a morpheme, a word, a word segment, a phrase, or a clause. For example, when it is assumed that a predetermined unit is a morpheme, the encoding unit 110 may tokenize each sentence by dividing each sentence into morpheme units. For example, when the sentence is 'Chul-su ga bap ul muk nun da (Chul-su eats rice)', the encoding unit 110 may generate seven tokens such as 'Chul-su', 'ga', 'bap', 'ul', 'muk', 'nun', and 'da' based on the morpheme. Therefore, the encoding unit 110 may extract the feature vector f=E(d) of the document d. For example, the feature vector f=[ 'Chul-su' 'ga', 'bap', 'ul', 'muk', 'nun', and 'da'] may be generated.

As an example, the dimension of the feature vector may be determined according to the number of all tokens included in the document. For example, when the document consists of 500 tokens, the dimension of the feature vector may be 500.

According to an embodiment, an extraction summary unit 120 may receive a feature vector and calculate a probability value that each sentence corresponds to a summary for each one or more sentences constituting the document data.

For example, the extraction summary unit 120 may receive the feature vector f of the document extracted by the encoding unit 110 as an input, and may calculate probability of each sentence, p=EL(f)={$p_1$, $p_2$, $p_3$, . . . , $p_n$}. For example, when it is determined that the sentence corresponds to the summary, it has a high probability value, and when it is determined that the sentence does not correspond to the summary, it is trained to have a low probability value.

According to an embodiment, the extraction summary unit 120 may generate an attention vector for a weight for each token based on the probability value. According to an example, each of the one or more sentences includes one or more tokens, and one or more tokens constituting one sentence may all have the same weight.

According to an example, the extraction summary unit 120 may generate an attention vector through a threshold value. For example, in setting the threshold value to 0.5, when the probability value of the sentence is greater than or equal to 0.5, the attention vector value is set to 1, and when the probability value of the sentence is less than 0.5, the attention vector value may be set to 0.

For example, when the probability value of sentence $d_1$ is 0.35, the attention vector values of tokens $t_{1,1}$, $t_{1,2}$, . . . , and $t_{1,m1}$ included in the sentence $d_1$ may all be 0. On the other hand, when the probability value of sentence $d_2$ is 0.7, the attention vector values of tokens $t_{2,1}$, $t_{2,2}$, . . . , and $t_{2,m2}$ included in the sentence $d_2$ may all be 1.

Therefore, since the decoding unit 130 concentrates on information on a sentence corresponding to 1 among the feature vectors f extracted by the encoding unit 110, information on a portion having relatively low importance may be excluded. In this case, the threshold may be set between 0 and 1 as needed.

According to an example, the extraction summary unit 120 may generate an attention vector using a probability value. For example, when the probability value of the sentence $d_1$ is 0.35, the attention vector values of tokens $t_{1,1}$, $t_{1,2}$, . . . , and $t_{1,m1}$ may all be 0.35.

Therefore, information of a sentence having a high probability value among the feature vectors f extracted by the encoding unit 110 is concentrated by the decoding unit 130, and information of less important parts may be excluded.

As an example, the dimension of the attention vector may be determined according to the number of all tokens included in the document. For example, when the document consists of 500 tokens, the dimension of the attention vector may be 500.

According to an embodiment, the extraction summary unit 120 may be trained using an extraction loss function calculated based on a probability value and a summary label value for document data.

According to an example, the extraction loss function ($L_E$) according to the probability value p(d) for each sentence and the summary label 1 for each sentence may be defined as in Equation 1.

$$L_E = -[l*\log \alpha(p(d)) + (1-l)*\log(1-\alpha(p(d)))] \quad \text{[Equation 1]}$$

In Equation 1, l has a value of 0 or 1 as a label value, and a is an arbitrary weight.

According to an embodiment, the decoding unit 130 may generate abstract summary data by receiving the feature vector and the attention vector as inputs.

According to an example, the decoding unit 130 may receive the feature vector f of the document extracted by the encoding unit 110, the summary data m, and the attention vector p generated by the extraction summary unit, and may output the token class m'=D(f, m, p) depending on the input.

According to an embodiment, the decoding unit 130 may be trained by using the abstract loss function calculated based on the abstract summary data generated based on the feature vector and the attention vector and the summary data for the document data. As an example, the abstract loss function ($L_D$) may be defined as follows.

$$L_D = -\log\left(\frac{\exp(m'\text{[class]})}{\sum_j (m_j)}\right) \quad \text{[Equation 2]}$$

According to an example, the loss function by document summary may be defined as Equation 3 below based on the extraction loss function and the abstract loss function.

$$l = \alpha * L_E(p(d), l) + \beta * L_D(m, m') \quad \text{[Equation 3]}$$

In this case, the weights $\alpha$ and $\beta$ may be determined according to the type of document data and loss function used.

According to an embodiment, the decoding unit 130 may assign a weight to each token included in the feature vector by multiplying the feature vector by the attention vector.

According to an example, when the feature vector of the document data generated by the encoding unit 110 is 500-dimensional, the dimension of the attention vector generated by the extraction summary unit 120 may also be 500-dimensional, and the weights of the elements included in the feature vector may be determined according to each matching element of the attention vector.

Figure 3:
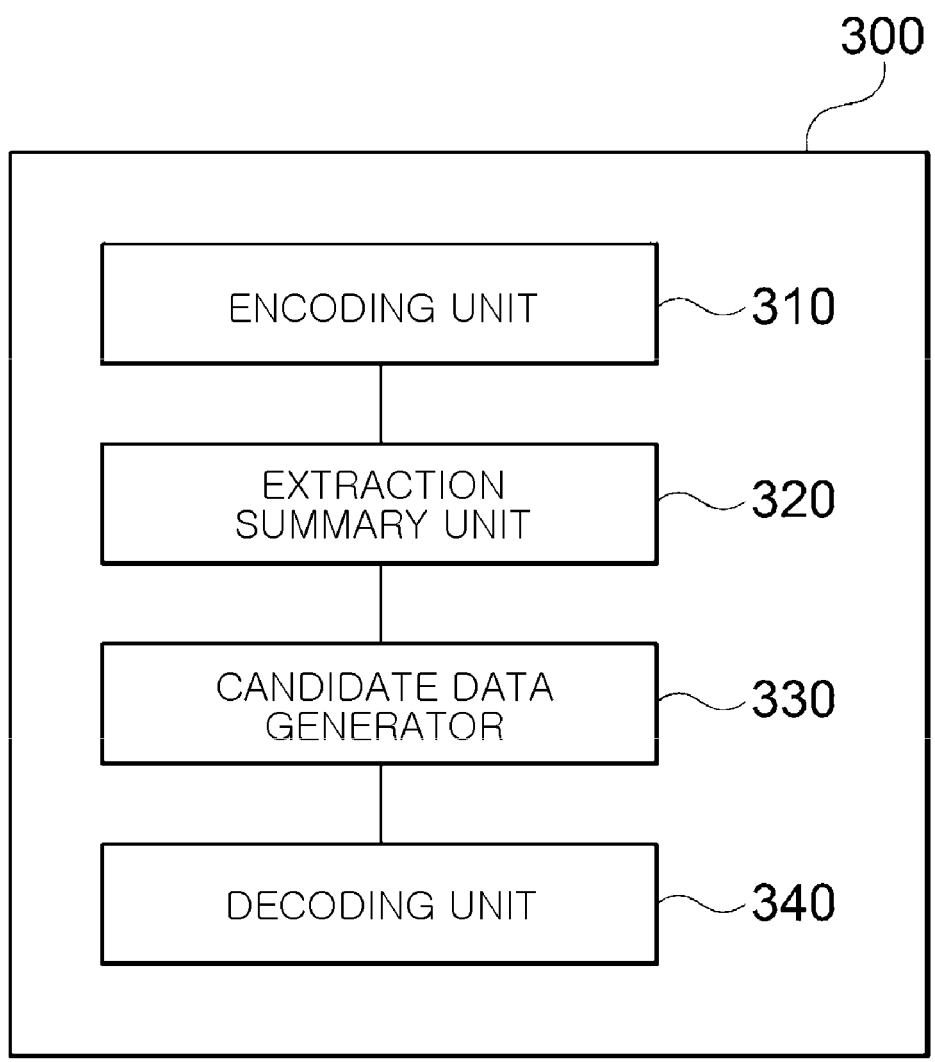
FIG. 3 is a block diagram of a document summarizing apparatus according to an embodiment.
Figure 4:
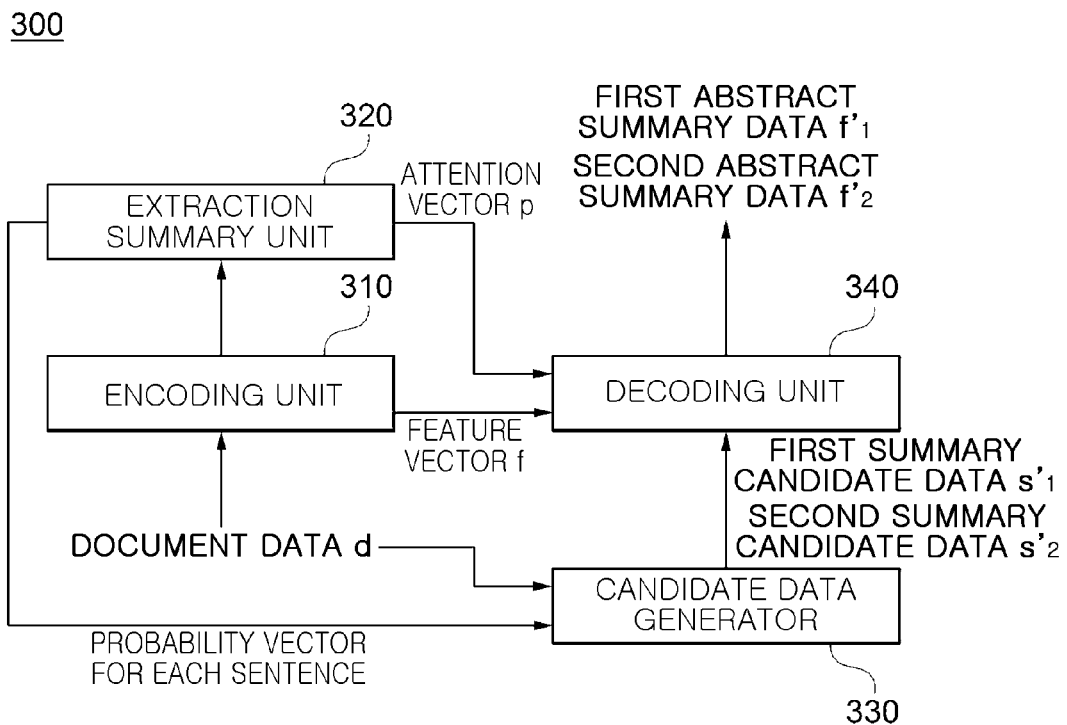
FIG. 4 is an illustrative diagram illustrating an operation of a document summarizing apparatus according to an embodiment.

FIG. 3 is a block diagram of a document summarizing apparatus according to an embodiment.

According to an embodiment, a document summarizing apparatus 300 may include an encoding unit 310, an extraction summary unit 320, a candidate data generator 330, and a decoding unit 340.

According to an embodiment, the encoding unit 310 may receive document data including one or more sentences as input, convert the received document data into a token defined in a predetermined unit, and generate a feature vector.

According to an example, the document data d may be classified for each sentence using a specific delimiter. For example, document may consist of one or more sentences as in d={$d_1$, $d_2$, . . . , $d_n$}. The encoding unit 310 may recognize the document for each sentence thereby.

According to an example, the encoding unit 310 may receive the document d and convert the received document d into a token defined in a predetermined unit. For example, the predetermined unit may be a phoneme, a syllable, a morpheme, a word, a word segment, a phrase, a clause, or the like. For example, when it is assumed that a predetermined unit is a morpheme, the encoding unit 310 may divide each sentence into a morpheme unit and tokenize the same. For example, when the sentence is 'Chul-su ga bap ul muk nun da (Chul-su eats rice)', the encoding unit 110 may generate seven tokens such as 'Chul-su', 'ga', 'bap', 'ul', 'muk', 'nun', and 'da' based on the morpheme. Therefore, the encoding unit 110 may extract the feature vector f=E(d) of the document d. For example, the feature vector f=['Chul-su', 'ga', 'bap', 'ul', 'muk', 'nun', and 'da'] may be generated.

As an example, the dimension of the feature vector may be determined according to the number of all tokens included in the document.

According to an embodiment, the extraction summary unit 320 receives a feature vector and calculates a probability value that each sentence corresponds to a summary for each one or more sentences constituting the document data, to generate a probability vector for each sentence, and may generate an attention vector for a weight for each token based on the probability value.

For example, the extraction summary unit 320 may receive the feature vector f of the document extracted by the encoding unit 310 as input, and may calculate probability of each sentence, p=EL(f)={$p_1$, $p_2$, $p_3$, ○ ○ ○, $p_n$}. For example, when it is determined that the sentence corresponds to the summary, a relatively high probability value is obtained, and when it is determined that the sentence does not correspond to the summary, it is trained to have a low probability value.

According to an example, the extraction summary unit 320 receives a feature vector as an input, and calculates the probability value that each sentence corresponds to the summary, with respect to each one or more sentences constituting the document data, thereby generating a probability vector for each sentence. For example, the probability for each sentence, p={0.1, 0.35, 0.75, ○ ○ ○, 0.15}, may be generated.

According to an embodiment, the extraction summary unit 320 may generate an attention vector for a weight for each token based on a probability value. According to an example, each of the one or more sentences includes one or more tokens, one or more tokens constituting one sentence may all have the same weight.

According to an example, the extraction summary unit 320 may generate an attention vector through a threshold value. For example, when the threshold is set to 0.5 and when the probability value of the sentence is greater than or equal to 0.5, the attention vector value is set to 1, and when the probability value of the sentence is less than 0.5, the attention vector value may be set to 0.

For example, when the probability value of the sentence $d_1$ is 0.35, the attention vector values of tokens $t_{1,1}$, $t_{1,2}, \ldots,$ and $t_{1,m1}$ included in the sentence $d_1$ may all be 0. On the other hand, when the probability value of sentence $d_2$ is 0.7, attention vector values of tokens $t_{2,1}$, $t_{2,2}, \ldots,$ and $t_{2,m2}$ included in sentence $d_2$ may all be 1.

Therefore, the decoding unit 330 may concentrate on the information on the sentence corresponding to 1 among the feature vectors f extracted by the encoding unit 310, and may exclude information of less important parts. In this case, the threshold may be set between 0 and 1 as needed.

According to an example, the extraction summary unit 320 may generate an attention vector using a probability value. As an example, when the probability value of sentence $d_1$ is 0.35, attention vector values of tokens $t_{1,1}$, $t_{1,2}, \ldots,$ and $t_{1,m1}$ contained in sentence $d_1$ may all have a value of 0.35.

Therefore, information of a sentence having a high probability value among the feature vectors f extracted by the encoding unit 310 is concentrated in the decoding unit 330, and information of less important parts may be excluded.

As an example, the dimension of the attention vector may be determined according to the number of all tokens included in the document.

According to an embodiment, the candidate data generator 330 may generate a plurality of summary candidate data from one or more sentences constituting the document based on the probability vector for each sentence.

According to an example, the candidate data generator 330 may generate a plurality of summary candidate data $s'_1$ and $s'_2$ by using the document d and the probability p(d) for each sentence extracted from the encoding unit 310.

According to an embodiment, the candidate data generator 330 may select n sentences in the order of the highest probability value from among one or more sentences constituting document data based on the probability vector for each sentence, and generate summary candidate data by selecting one or more sentences from among the selected n sentences. In this case, the selection of sentences to be included in each summary candidate data among the n sentences may be randomly performed, but a method of selecting sentences to be included in each summary candidate data is not necessarily limited to a specific example.

According to an example, the candidate data generator 330 may generate two summary candidate data by randomly selecting k sentences, after extracting candidate sentence c for n sentences with high probability p (d) per sentence from document d consisting of total N sentences. For example, when five summary candidate sentences c are selected, for example, $c=\{d_1, d_4, d_5, d_7, d_{10}\}$ may be generated. In this case, when generating summary candidate data by selecting three sentences, the plurality of summary candidate data may be generated as, for example, $s'_1=\{d_1, d_4, d_7\}$ and $s'_2=\{d_1, d_5, d_7\}$.

According to an embodiment, the plurality of summary candidate data may include the same number of sentences. As described above, the plurality of summary candidate data may consist of three sentences identically. Also, at least one of the sentences constituting the plurality of respective summary candidate data may be a different sentence. For example, when $s'_1=\{d_1, d_4, d_7\}$ and $s'_2=\{d_1, d_5, d_7\}$ as described above, $s'_1$ and $s'_2$ may have different sentences '$d_4$' and '$d_5$'. Accordingly, when the candidate data generator 330 generates the summary candidate data and when the plurality of summary candidate data consists only of the same sentences, new summary candidate data may be generated.

On the other hand, the numbers of sentences included in the plurality of summary candidate data are not necessarily the same, and according to embodiments, the number of sentences included in respective summary candidate data may be different. In detail, in the above example, a plurality of summary candidate data may be generated as $s'_1=\{d_1, d_4, d_7\}$ and $s'_2=\{d_1, d_5\}$.

According to an embodiment, the decoding unit 340 may receive a feature vector, an attention vector, and a plurality of summary candidate data, and generate abstract summary data for respective summary candidate data.

According to an example, the decoding unit 340 may receive the feature vector f of the document extracted by the encoding unit 310, summary candidate data $s'_1$ and $s'_2$ generated by the candidate data generator 330, and attention vector p generated by the extraction summary unit 320, and may generate two abstract summary data $f'_1=D(f, s'_1, p)$ and $f'_2=D(f, s'_2, p)$. According to an embodiment, the decoding unit 340 may be trained by using a similarity loss function based on the similarity of abstract summary data with respect to each summary candidate data.

For example, the two abstract summary data generated by the decoding unit 340 may include different texts. However, the two abstract summary data are trained to recognize that the two abstract summary data are semantically similar texts, and to this end, the similarity loss function may be defined as follows such that the generated two abstract summary data may be similar.

$$L_s = -\log \frac{\exp\left(\frac{sim(f_1, f_2)}{\tau}\right)}{\sum_{j[j=1]} \exp\left(\frac{sim(f_1, f_j)}{\tau}\right)} \qquad \text{[Equation 4]}$$

In Equation 4, $sim(f_1, f_2)$ represents the similarity of two abstract summary data $f_1$ and $f_2$.

Figure 5:
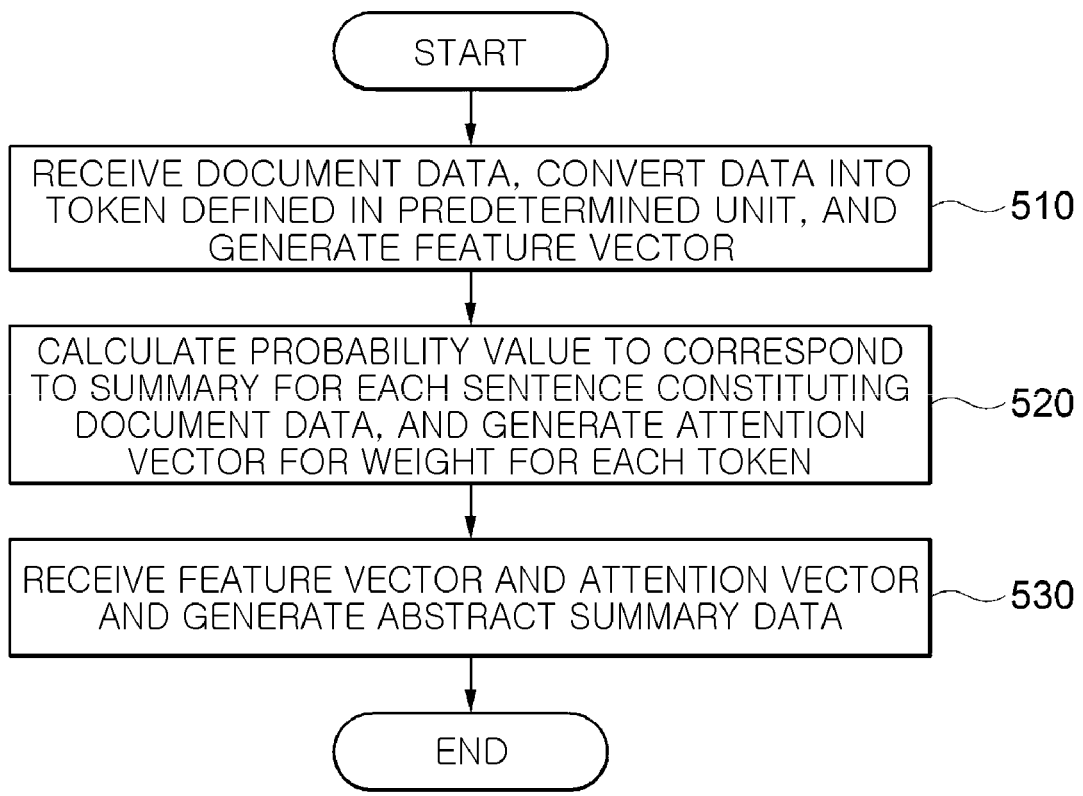
FIG. 5 is a flowchart of a document summarization method according to an embodiment.

FIG. 5 is a flowchart of a document summarization method according to an embodiment.

According to an embodiment, the document summarizing apparatus receives document data including one or more sentences as input, and converts the received document data into a token defined in a predetermined unit, to generate a feature vector (510).

According to an example, the document data d may be classified using a specific delimiter for each sentence. For example, document d may consist of one or more sentences as in $d=\{d_1, d_2, \ldots, d_n\}$. The document summarizing apparatus may recognize the document for each sentence thereby.

According to an example, the document summarizing apparatus may receive the document d and convert the received d into a token defined in a predetermined unit. For example, the predetermined unit may be a phoneme, a syllable, a morpheme, a word, a word segment, a phrase, or a clause. The document summarizing apparatus may extract a feature vector f=E(d) of the document d. As an example, the dimension of the feature vector may be determined according to the number of all tokens included in the document.

According to an embodiment, the document summarizing apparatus may receive a feature vector and calculate a probability value that each sentence corresponds to a summary for each one or more sentences constituting the document data, and may generate an attention vector for a weight for each token based on the probability value (520).

For example, the document summarizing apparatus may receive the feature vector f of the extracted document as input, and calculate probability of each sentence, $p=EL(f)=\{p_1, p_2, p_3, \circ\circ\circ, p_n\}$. For example, when it is determined that the sentence corresponds to the summary, a high probability value is obtained, and when it is determined that the sentence does not correspond to the summary, it is trained to have a low probability value.

According to an embodiment, the document summarizing apparatus may generate an attention vector for a weight for each token based on a probability value. According to an example, each of the one or more sentences includes one or more tokens, and one or more tokens constituting one sentence may all have the same weight.

As an example, the document summarizing apparatus focuses on information of a sentence having a high probability value among the extracted feature vectors f, and may exclude information of less important parts. As an example, the dimension of the attention vector may be determined according to the number of all tokens included in the document.

According to an embodiment, the document summarizing apparatus may be trained using an extraction loss function calculated based on a probability value and a summary label value for document data.

According to an embodiment, the document summarizing apparatus may receive a feature vector and an attention vector and generate abstract summary data (530).

According to an example, the document summarizing apparatus may output the token class $m'=D(f, m, p)$ based on the feature vector f of the extracted document, the summary data m, and the attention vector p.

According to an embodiment, the document summarizing apparatus may be trained by using abstract summary data generated based on the feature vector and the attention vector, and the abstract loss function calculated based on summary data for document data.

According to an example, a loss function by document summary may be defined based on an extraction loss function and an abstract loss function.

According to an embodiment, the document summarizing apparatus may assign a weight to each token included in the feature vector by multiplying the feature vector by the attention vector.

Figure 6:
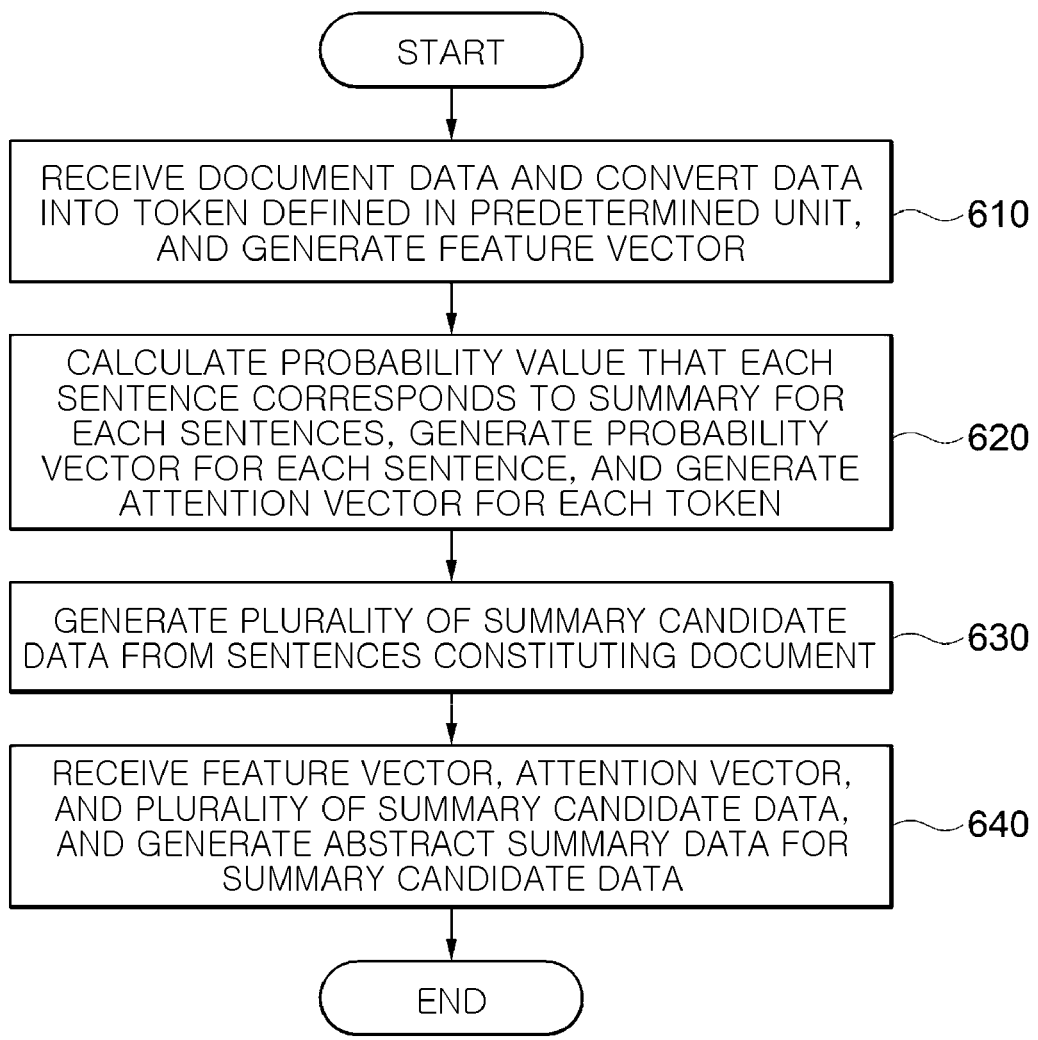
FIG. 6 is a flowchart of a document summarization method according to an embodiment.

FIG. 6 is a flowchart of a document summarization method according to an embodiment.

According to an embodiment, the document summarizing apparatus receives document data including one or more sentences as input, and converts the received document data into a token defined in a predetermined unit, to generate a feature vector (610).

According to an example, the document data d may be classified for each sentence using a specific delimiter. For example, as in $d=\{d_1, d_2, \ldots, d_n\}$, the document d may consist of one or more sentences. The document summarizing apparatus may recognize the document for each sentence thereby.

According to an example, the document summarizing apparatus may receive the document d and convert the same into a token defined in a predetermined unit. For example, the predetermined unit may be a phoneme, a syllable, a morpheme, a word, a word segment, a phrase, or a clause. As an example, the document summarizing apparatus may extract a feature vector $f=E(d)$ of the document d. As an example, the dimension of the feature vector may be determined according to the number of all tokens included in the document.

According to an embodiment, the document summarizing apparatus may receive a feature vector as input to calculate the probability value that each sentence corresponds to the summary for each one or more sentences constituting the document data, and may generate a probability vector for each sentence, and may generate an attention vector for a weight for each token based on the probability value (620).

For example, the document summarizing apparatus may receive the feature vector f of the extracted document and calculate the probability $p=EL(f)=\{p_1, p_2, p_3, \ldots, p_n\}$ for each sentence. For example, when it is determined that the sentence corresponds to the summary, a high probability value is provided, and when it is determined that the sentence does not correspond to the summary, it is trained to have a low probability value.

According to an example, the document summarizing apparatus may receive a feature vector and calculate a probability value that each sentence corresponds to a summary for each one or more sentences constituting the document data, and may thus generate a probability vector for each sentence.

According to an embodiment, the document summarizing apparatus may generate an attention vector for a weight for each token based on a probability value. According to an example, each of the one or more sentences includes one or more tokens, and one or more tokens constituting one sentence may all have the same weight. As an example, the dimension of the attention vector may be determined according to the number of all tokens included in the document.

According to an embodiment, the document summarizing apparatus may generate a plurality of summary candidate data from one or more sentences constituting the document, based on the probability vector for each sentence (630).

According to an example, the document summarizing apparatus may generate a plurality of summary candidate data $s'_1$ and $s'_2$ by using the document d and the probability p (d) for each extracted sentence.

According to an embodiment, the document summarizing apparatus may select n sentences in the order of the highest probability value among one or more sentences constituting document data, based on the probability vector for each sentence, and select one or more of the selected n sentences, thereby generating summary candidate data.

According to an embodiment, the plurality of summary candidate data may consist of the same number of sentences. Also, at least one of the sentences constituting the plurality of respective summary candidate data may be a different sentence. Accordingly, the document summarizing apparatus may generate new summary candidate data, when generating summary candidate data and when a plurality of summary candidate data consists of only the same sentences.

According to an embodiment, the document summarizing apparatus may receive a feature vector, an attention vector, and a plurality of summary candidate data as inputs, and generate abstract summary data for each summary candidate data (640).

According to an example, the document summarizing apparatus may receive the feature vector f of the extracted document, summary candidate data $s'_1$ and $s'_2$, and the attention vector p as inputs, and generate two abstract summary data $f'_1 = D(f, s'_1, p)$ and $f'_2 = D(f, s'_2, p)$.

According to an embodiment, the document summarizing apparatus may be trained using a similarity loss function based on the similarity of abstract summary data with respect to each summary candidate data.

For example, the two generated abstract summary data may include different texts. However, it may be trained to recognize that the two abstract summary data are semantically similar texts, and for this usage, a similarity loss function may be defined such that two generate abstract summary data may be similar.

Figure 7:
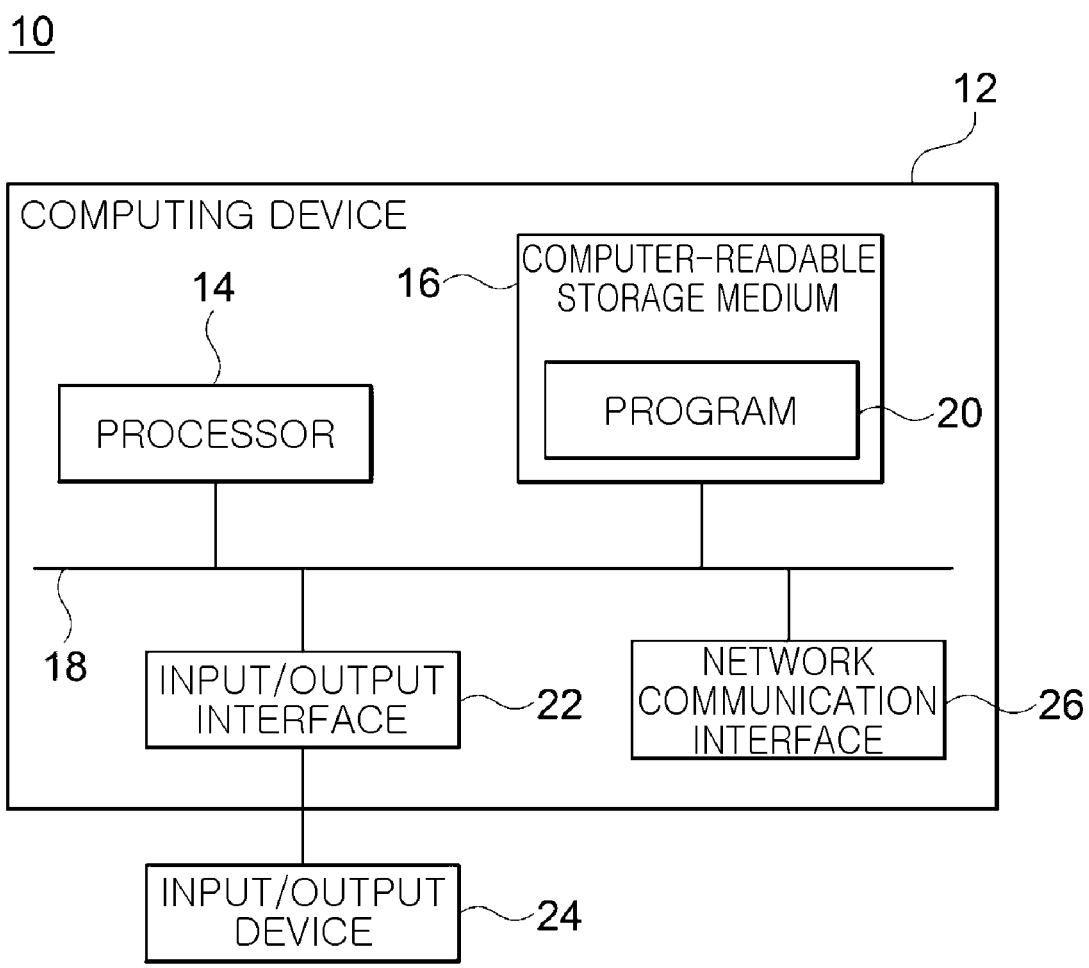
FIG. 7 is a block diagram illustrating and describing a computing environment including a computing device according to an embodiment.

FIG. 7 is a block diagram illustrating a computing environment including a computing device according to an embodiment, as an example.

In the illustrated embodiment, respective components may have different functions and capabilities other than those described below, and additional components may be included in addition to those described below.

A computing environment 10 includes a computing device 12. In an embodiment, the computing device 12 may be one or more components included in the document summarizing apparatus 100, 300. The computing device 12 includes at least one processor 14, a computer-readable storage medium 16, and a communication bus 18. The processor 14 may enable the computing device 12 to operate in accordance with the illustrative embodiments discussed above. For example, the processor 14 may execute one or more programs stored in the computer-readable storage medium 16. The one or more programs may include one or more computer-executable instructions, and when the computer executable instructions are executed by the processor 14, the processor may be configured such that the computing device 12 performs operations in accordance with example embodiments.

The computer-readable storage medium 16 is configured to store computer-executable instructions or program code, program data, and/or other suitable form of information. The program 20 stored in the computer-readable storage medium 16 includes a set of instructions executable by the processor 14. In an embodiment, the computer-readable storage medium 16 may be a memory (a volatile memory, such as a random access memory, a non-volatile memory, or a suitable combination thereof), one or more magnetic disk storage devices, optical disk storage devices, flash memory devices, other types of storage media accessed by the computing device 12 and capable of storing required information, or suitable combinations thereof.

The communication bus 18 interconnects various other components of the computing device 12, including the processor 14 and the computer-readable storage medium 16.

The computing device 12 may also include one or more input/output interfaces 22 that provide interfaces for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. Examples of the input/output device 24 may include an input device, such as pointing devices (such as a mouse or trackpad), keyboards, touch input devices (such as touchpads or touchscreens), voice or sound input devices, various types of sensor devices and/or imaging devices, and/or an output device, such as display devices, printers, speakers and/or network cards. The illustrative input/output device 24 may be included in the computing device 12 as a component constituting the computing device 12, and may be connected to the computing device 12 as a separate device distinct from the computing device 12.

As set forth above, according to embodiments, a high-level language function called document summary may be trained by using text without summary information. In addition, the extraction summary and abstract summary functions may be trained and inferred simultaneously, and therefore, disadvantages of the extraction summary model and the abstract summary model may be mutually supplemented.

While example embodiments have been shown and described above, the same will be apparent to those skilled in the art that modifications and variations could be made without departing from the scope of the present disclosure as defined by the appended claims.

What is claimed is:

1. A document summarizing apparatus, the document summarizing apparatus comprising:
   a processor;
   a memory storing one or more programs configured to be executed by the processor; and
   the one or more programs include instructions for;
   an encoding unit configured to receive document data including one or more sentences and convert the document data into a token defined in a predetermined unit to generate a feature vector;
   an extraction summary unit configured to receive the feature vector and calculate probability values that each sentence of the one or more sentences corresponds to a summary, and generate, for each sentence, an attention vector for a token weight to be applied to each token included in a sentence, based on a probability value of the sentence; and
   a decoding unit configured to receive the feature vector and the attention vector and generate abstract summary data, based on the feature vector and the attention vector.

2. The document summarizing apparatus of claim 1, wherein the extraction summary unit is further configured to be trained by using an extraction loss function calculated based on the probability values and a summary label value for the document data.

3. The document summarizing apparatus of claim 1, wherein the decoding unit is further configured to be trained by using the abstract summary data and an abstract loss function calculated based on summary data for the document data.

4. The document summarizing apparatus of claim 1, wherein the decoding unit is further configured to multiply the feature vector by the attention vector to assign a weight to each token included in the feature vector.

5. The document summarizing apparatus of claim 1, wherein each of the one or more sentences comprises one or more tokens,
   wherein all of the one or more tokens included in each of the one or more sentences have the same weight.

6. A document summarizing apparatus, the document summarizing apparatus comprising:
   a processor;
   a memory storing one or more programs configured to be executed by the processor; and the one or more programs include instructions for;
an encoding unit configured to receive document data including one or more sentences and convert the document data into a token defined in a predetermined unit to generate a feature vector;
an extraction summary unit configured to receive the feature vector and calculate probability values that each sentence of the one or more sentences corresponds to a summary to generate a probability vector for each sentence, and generate, for each sentence, an attention vector for a token weight to be applied to each token included in a sentence, based on a probability value of the sentence;
a candidate data generator configured to generate a plurality of summary candidate data from the one or more sentences, based on the probability vector for each sentence; and
a decoding unit configured to receive the feature vector, the attention vector, and the plurality of summary candidate data, and generate abstract summary data for each summary candidate data.

7. The document summarizing apparatus of claim 6, wherein the candidate data generator is further configured to select n sentences in an order of a high probability value from among the one or more sentences, based on the probability vector for each sentence, and select one or more of the selected n sentences to create summary candidate data.

8. The document summarizing apparatus of claim 6, wherein the decoding unit is further configured to be trained by using a similarity loss function, based on similarity of the abstract summary data with respect to the respective summary candidate data.

9. A document summarization method performed by a computing device comprising at least one processor and a computer-readable storage medium storing one or more programs implemented by the at least one processor, the method comprising:
an encoding operation of receiving document data including one or more sentences, converting the document data into a token defined in a predetermined unit, and generating a feature vector;
an extraction summary operation of receiving the feature vector, calculating probability values that each sentence of the one or more sentences corresponds to a summary, and generating, for each sentence, an attention vector for a token weight to be applied to each token included in a sentence, based on a probability value of the sentence; and
a decoding operation of generating abstract summary data by receiving the feature vector and the attention vector as inputs.

10. The document summarization method of claim 9, wherein the extraction summary operation further comprises learning by using an extraction loss function calculated based on the probability value and a summary label value for the document data.

11. The document summarization method of claim 9, wherein the decoding operation further comprises learning by using the abstract summary data and an abstract loss function calculated based on summary data for the document data.

12. The document summarization method of claim 9, wherein the decoding operation further comprises assigning a weight to each token included in the feature vector by multiplying the feature vector by the attention vector.

13. The document summarization method of claim 9, wherein each of the one or more sentences comprises one or more tokens,
wherein all of the one or more tokens included in each of the one or more sentences have the same weight.

14. A document summarization method performed by a computing device comprising at least one processor and a computer-readable storage medium storing one or more programs implemented by the at least one processor, the method comprising:
an encoding operation of generating a feature vector by receiving document data including one or more sentences and converting the document data into a token defined in a predetermined unit;
an extraction summary operation of receiving the feature vector and calculating probability values that each sentence of the one or more sentences corresponds to a summary to generate a probability vector for each sentence, and generating, for each sentence, an attention vector for a token weight to be applied to each token included in a sentence, based on a probability value of the sentence;
a candidate data generation operation of generating a plurality of summary candidate data from the one or more sentences, based on the probability vector for each sentence; and
a decoding operation of receiving the feature vector, the attention vector, and the plurality of summary candidate data, and generating abstract summary data for each summary candidate data.

15. The document summarization method of claim 14, wherein the candidate data generation operation further comprises selecting n sentences in an order of a high probability value from among the one or more sentences, based on the probability vector for each sentence, and selecting one or more of the selected n sentences to generate summary candidate data.

16. The document summarization method of claim 14, wherein in the decoding operation, learning is performed using a similarity loss function based on a similarity of the abstract summary data for each of the summary candidate data.

* * * * *